S. B. Kline.

Fly Net.

N° 87,499. Patented Mar. 2, 1869.

WITNESSES:
Randolph Coyle
Charles Bishop

INVENTOR:
Sam'l B. Kline
per Prindle and Co.
attorneys

SAMUEL B. KLINE, OF MECHANICSBURG, PENNSYLVANIA.

Letters Patent No. 87,499, dated March 2, 1869; antedated February 27, 1869.

IMPROVED FLY-NET FOR HORSES.

The Schedule referred to in these Letters Patent and making part of the same.

*To all whom it may concern:*

Be it known that I, SAMUEL B. KLINE, of Mechanicsburg, in the county of Cumberland, and in the State of Pennsylvania, have invented an Improved Fly-Net for Horses, &c.; and do hereby declare that the following is a full, clear, and exact description thereof, reference being had to the accompanying drawings, making a part of this specification, in which—

Figure 1:
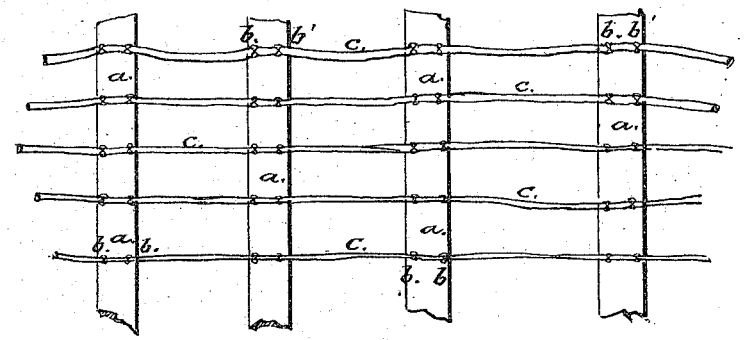
Figure 2:
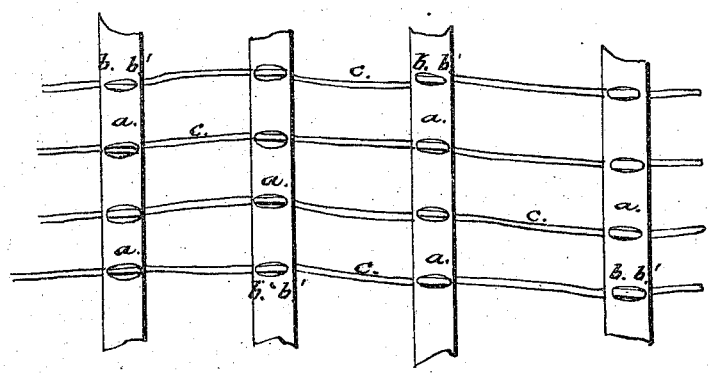
Figure 3:

Figure 1 is a top view of a section of a net.
Figure 2 is a bottom view of the same.
Figure 3 is a cross-section of a rib, showing the loop-stitch.

The nature of my invention consists in so constructing a fly-net for horses, that, while equally simple and cheap, it is more durable than any now in use, and is fully described below.

In the annexed drawings—

$a\ a$ represent the ribs, having near each edge a row of holes, $b\ b'$, one-half inch apart, and the rows so arranged that a line passing across, or at a right angle to the rib, may intersect one hole in each row.

$c\ c$ represent the lashes, or strands, by means of which the ribs are connected together. They are secured to the ribs by a double loop-stitch, which is formed by passing one end downward through a hole, $b$, upward through the opposite one, $b'$, downward again through the first hole $b$, and upward a second time through the last hole $b'$, when, upon being drawn tight, a stitch or loop is formed with a single strand upon the top, and a double strand upon the bottom of the rib, as shown in fig. 3.

A net constructed in this manner, is easily made, cheaper, and more durable than any in use, as there is no possibility of the loops or stitches slipping while in use, and thereby deranging the net, and rendering it useless for the purpose intended.

Having thus fully set forth the nature and merits of my improvement,

What I claim as my invention, and desire to secure by Letters Patent, is—

The double loop or stitch, when used in constructing fly-nets, substantially as and for the purpose herein shown and described.

Also, a fly-net, constructed in the manner substantially as shown.

In testimony that I claim the foregoing, I have hereunto set my hand, this 11th day of August, 1868.

SAMUEL B. KLINE.

Witnesses:
JOHN PALMER,
THOMAS KLINE.